(12) United States Patent
Vaniglia

(10) Patent No.: US 8,684,720 B2
(45) Date of Patent: Apr. 1, 2014

(54) FIBER DELIVERY SYSTEM FOR COMPOSITE PART MANUFACTURE

(75) Inventor: Milo M. Vaniglia, Cold Spring, KY (US)

(73) Assignee: Fives Machining Systems, Inc., Fond du Lac, WI (US)

( * ) Notice: Subject to any disclaimer, the term of this patent is extended or adjusted under 35 U.S.C. 154(b) by 239 days.

(21) Appl. No.: 13/311,065

(22) Filed: Dec. 5, 2011

(65) Prior Publication Data

US 2013/0142898 A1 Jun. 6, 2013

(51) Int. Cl.
*B29C 31/04* (2006.01)

(52) U.S. Cl.
USPC ............................ 425/150; 425/375; 425/460

(58) Field of Classification Search
USPC ......................................... 425/150, 375, 460
See application file for complete search history.

(56) References Cited

U.S. PATENT DOCUMENTS

| | | | |
|---|---|---|---|
| 4,281,803 A | 8/1981 | Massey | |
| 4,699,683 A * | 10/1987 | McCowin | ...................... 156/353 |
| 4,724,873 A | 2/1988 | Abe | |
| 5,022,952 A | 6/1991 | Vaniglia | |
| 5,110,395 A | 5/1992 | Vaniglia | |
| 5,223,072 A | 6/1993 | Brockman et al. | |
| 5,454,897 A | 10/1995 | Vaniglia | |
| 5,645,677 A | 7/1997 | Cahuzac et al. | |
| 5,662,759 A | 9/1997 | Cornet et al. | |
| 5,679,195 A | 10/1997 | O'Dwyer et al. | |
| 6,096,164 A | 8/2000 | Benson et al. | |
| 6,112,792 A | 9/2000 | Barr et al. | |
| 6,491,773 B1 | 12/2002 | Miller et al. | |
| 7,353,853 B2 | 4/2008 | Borgmann et al. | |
| 7,524,398 B2 | 4/2009 | Downing et al. | |
| 8,003,034 B2 * | 8/2011 | Oldani et al. | ................. 264/257 |
| 8,151,854 B2 * | 4/2012 | Oldani | ......................... 156/433 |
| 2007/0044919 A1 | 3/2007 | Hoffmann | |
| 2009/0229760 A1 | 9/2009 | Hamlyn et al. | |
| 2010/0186879 A1 | 7/2010 | Machamer | |
| 2012/0090788 A1 * | 4/2012 | Oldani et al. | ................. 156/441 |

\* cited by examiner

*Primary Examiner* — James Sanders
(74) *Attorney, Agent, or Firm* — Reising Ethington P.C.

(57) ABSTRACT

A gantry mounted fiber placement machine has a creel and a head with a compaction roller for applying fiber to a mold or tool. The fiber placement machine has 6 axes of motion. The machine has a gantry that moves in the X-axis, a horizontal gantry beam that is parallel to the Y-axis, and a creel that moves with the gantry in the X-axis. The machine has a head that moves in the Y-axis parallel to the floor and across the gantry beam, and in the Z-axis perpendicular to the X and Y-axes. The head swivels in the I-axis as it rotates about the X-axis, in the J-axis as it rotates about the Y-axis, and in the K-axis as it rotates about the Z-axis.

14 Claims, 7 Drawing Sheets

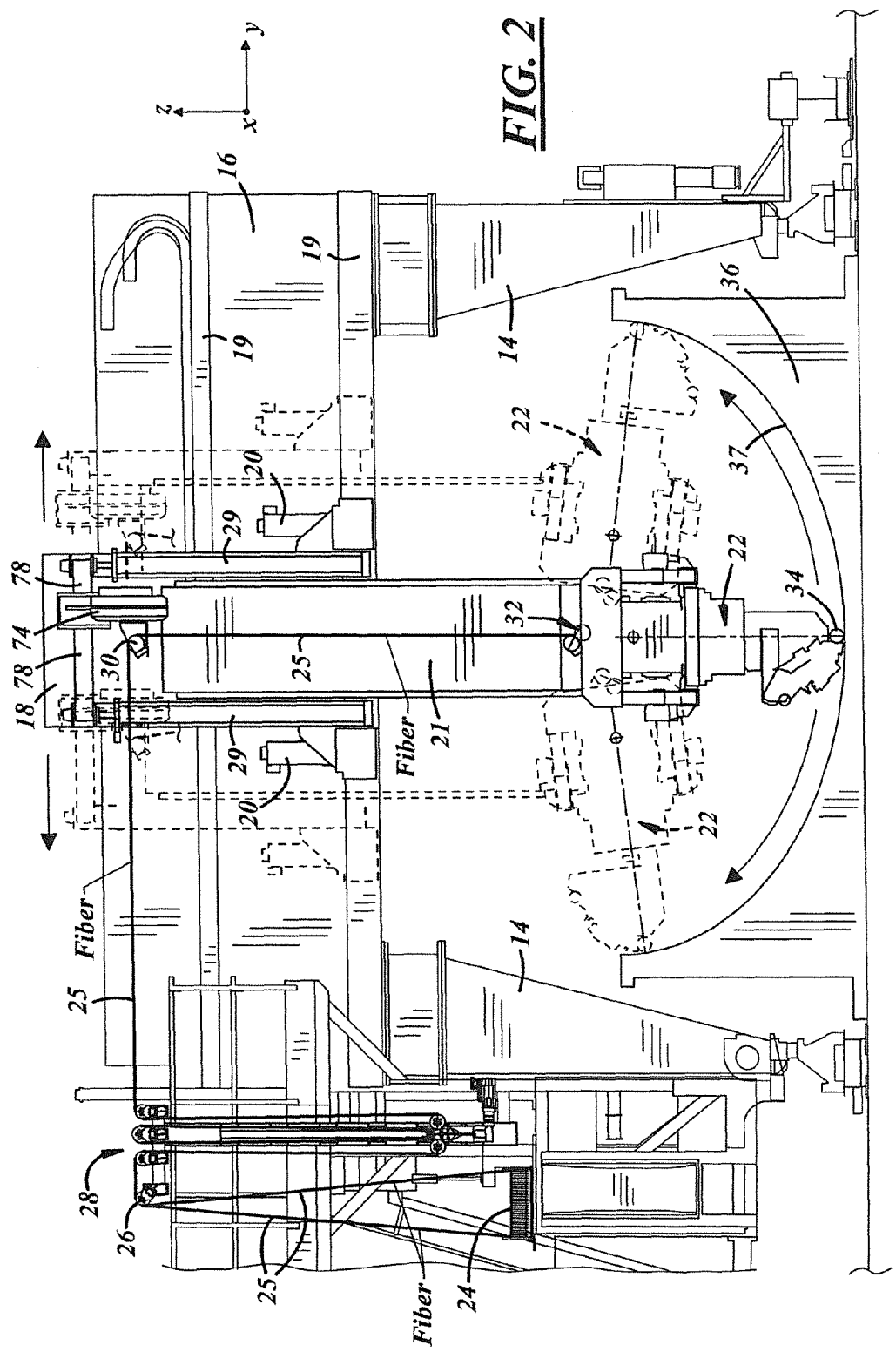

FIBER DELIVERY SYSTEM FOR COMPOSITE PART MANUFACTURE

BACKGROUND

Fiber composite materials are low in weight and high in strength and thus are increasingly used for aerospace and wind turbine applications. In the past, the majority of aerospace and wind turbine parts were made by a hand layup process. Using hand layup methods, a hundred pound part can be laid up at the rate of 2½ pounds per hour. Thus, a 100 pound part would require 40 hours of layup time. It has become apparent that the layup rates need to increase in order to meet demand with larger parts. This requires a better utilization of labor and a better utilization of tooling and floor space.

SUMMARY

Typical materials used for fiber composite manufacture are broad goods which may be unidirectional, cross-plied, and bias-plied. Unidirectional tape products include release paper backing that has to be removed from the tape and disposed of. Tow and tape materials are also used. Tow is wound on a spool and resembles a flat thread. Typical tow is ⅛, ¼ or ½ inches wide. Tape may be 3, 6 or 12 inches in width.

Automating the hand layup process with machine automation provides several advantages, including better quality and repeatability, increased productivity, reduced labor cost and reduced overall part cost. Parts laid up by machine automation have several benefits. These benefits include fibers being able to be laid down in tension, wrinkle-free lamination, better compaction with no need to de-bulk the laid-up product during lamination, repeatable placement accuracy, less manual contact with the material, and fiber steering if needed. Machine lay-up also eliminates the double handling of material, first to cut the material then to kit it. If prepreg material is used, a resin infusion cycle is not required. New resin systems used in machine layup also contribute to the reduction of the overall cure cycle time.

For wind applications, spar caps, shear webs and outer shells or skins can be ideally adapted for automated fiber layup. The outer shells or skins of wind turbine blades may have half pipe root ends which attach to the hub of a wind turbine, and it would be advantageous to be able to lay up these elements using an automated process.

The benefits of automated manufacture include unidirectional continuous fiber laminated in tension. Spar caps may be manufactured from glass or carbon fiber. Shear webs are manufactured from glass fiber laminated over a core. The root end of a blade, outer mold, and skins can be manufactured out of glass fiber. Additionally glass fiber tape, tow preg, or slit tape may be used.

The layup rates using automated machines vary depending on the ply angle, the geometry size and shape of the part. Long zero degree plies that run the length of the machine in the direction of the X-axis have higher layup rates. Fiber composite machines specifically designed for the manufacture of wind turbine blades are typically also used to layup spars, spar caps, sheer webs, and shell molds. In order to successfully manufacture these products, a fiber placement head requires six axis of motion.

BRIEF DESCRIPTION OF THE DRAWINGS

FIG. 2 is a front view of the gantry of a fiber placement machine.

DETAILED DESCRIPTION

Figure 1:
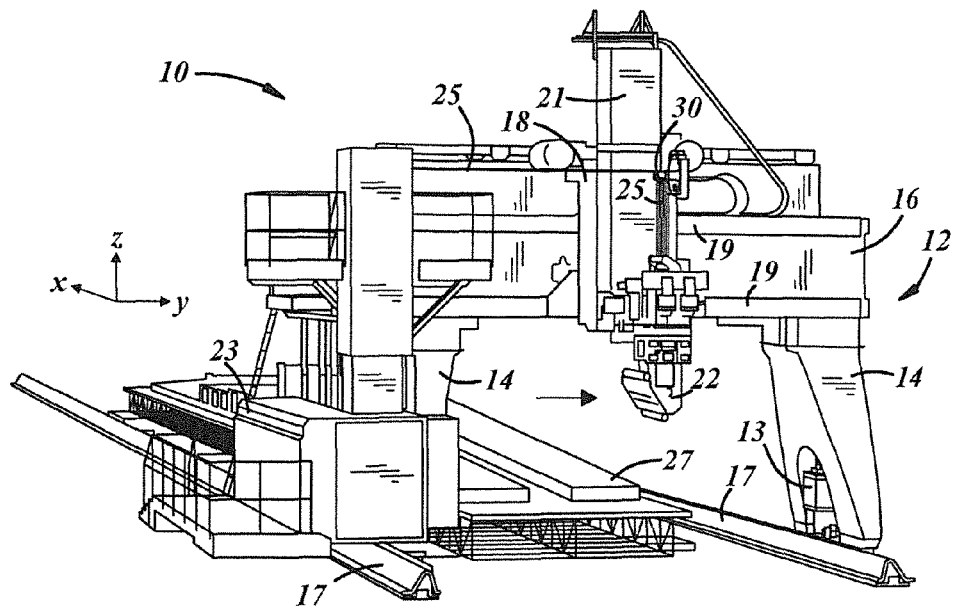
FIG. 1 is a perspective view of a gantry type fiber placement machine.

FIG. 1 shows a fiber composite machine generally designated by the reference numeral 10. The machine comprises a gantry 12 formed from two vertical legs 14 and a crossbeam 16. The gantry 12 is mounted on rails 17 that extend along the X-axis of the machine. One or more X-axis drive motors 13 may be used to drive the gantry on the rails 17. The crossbeam 16 extends along the Y-axis and supports a cantilever mounted saddle 18 which rides on two spaced horizontal rails 19. One or more Y-axis drive motors 20 may be used to drive the saddle on the horizontal rails 19. A vertical slide or column 21 is mounted on the saddle 18 and the column is moveable vertically in the Z-axis by means of one or more vertical drive cylinders 29. A fiber placement head 22 is mounted on the lower end of the column 21 as described more fully in connection with FIG. 3. A creel 23 is provided next to one of the legs 14. In some applications, two creels may be provided, one next to each of the legs 14. The creel 23 holds spools of fiber that will be supplied to the head 22. In one application, the creel 23 holds thirty-two spools of fiber, and thirty two fiber bands or threads are supplied to the head. The head 22 is used to apply fiber to a mold or tool 27 that is positioned beneath the gantry 12.

Figure 12:
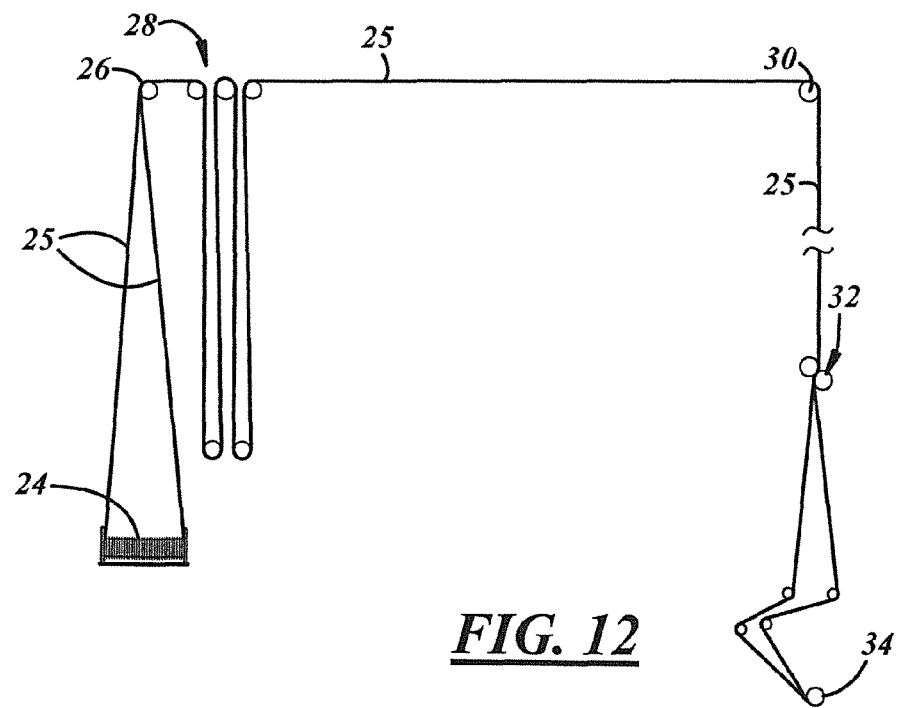
FIG. 12 is a schematic view of the fiber path from the top of the creel to the application roller in the fiber placement head.

FIG. 2 is a front view of the gantry 12 showing the fiber path between the creel 23 and the head 22, and FIG. 12 is a schematic view of the fiber path. Fiber 25 is supplied from the creel 23 to a creel redirect roller 24 mounted on top of the creel. From the creel redirect roller 24 the fiber 25 travels vertically in the direction of the Z-axis to an upper stationary redirect roller 26, and from the upper stationary redirect roller the fiber travels along horizontally to a festoon mechanism 28. The structure and operation of the festoon mechanism 28 is described in greater detail in connection with FIGS. 4-6. The fiber 25 travels from the festoon mechanism 28 to a B-axis roller 30 that is mounted on the saddle 18, and from the B-axis roller 30 the fiber travels vertically downward to A-axis rollers 32 that are mounted on the top of the head 22. The fiber travels through the head 22 to a compaction roller 34 having a center axis 35 that is mounted on the bottom of the head and applies fiber to a mold or tool 36.

FIG. 2 shows the head 22 in position to lay fiber tow on the surface of the half pipe end 37 of composite part. The head 22 swivels through an angle of at least 180° to enable it to lay fiber on the half pipe end 37 having an axis of curvature that is parallel to the X-axis of the machine 10. The head 22 is shown in solid in contact with the bottom of the half pipe end 37, and in phantom in two positions on either side of the half pipe end 37. The head 22 moves from the phantom position on the left side of the mold to the phantom position on the right side of the mold by rotating about the X-axis of the machine at the same time as the moving column 21 moves horizontally across the Y-axis and vertically in the Z-axis as required in order to maintain the compaction roller 34 in contact with the surface 37.

Figure 3:
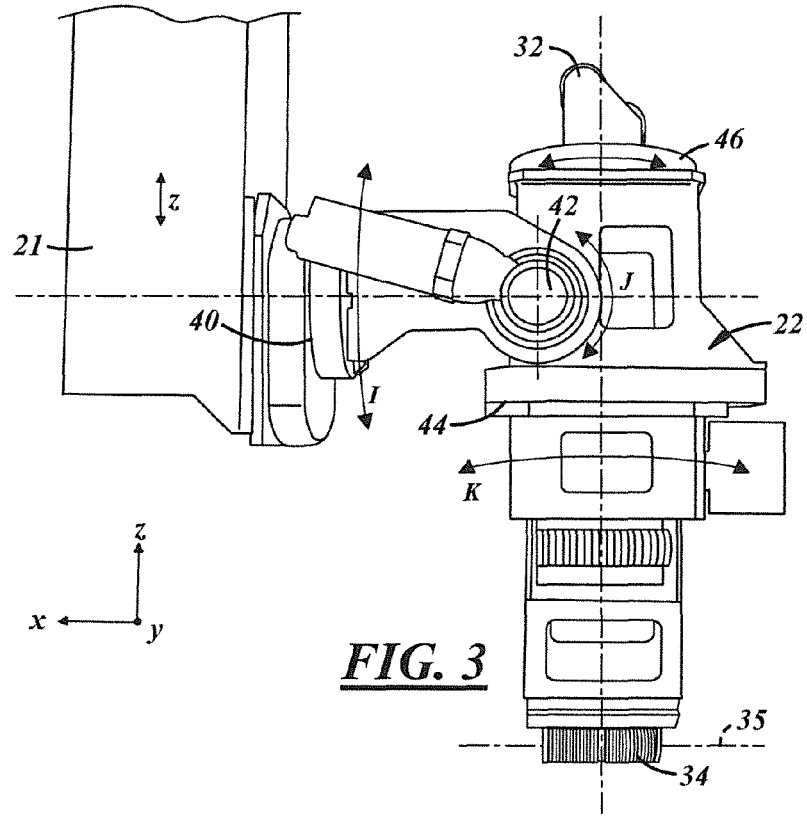
FIG. 3 is a side view of the mounting of the head on the column of a fiber placement machine.

FIG. 3 is a side view of the head showing the mounting of the head 22 to the lower end of the vertical column 21. The column 21 moves up and down in the Z-axis, and thus provides Z-axis motion to the head 22. The head 22 is mounted to the column 21 by an I-axis swivel 40 which provides pivoting motion of the head about an axis that is parallel to the X-axis of the machine. This is the first rotary motion of the head. The second rotary motion of the head 22 is around the J-axis 42 which is a pivoting motion of the head that is parallel to the Y-axis. The third rotary motion of the head 22 is a swiveling motion around the K-axis 44 which is perpendicular to the I-axis 40 and the J-axis 42. FIG. 3 also shows the A-axis swivel 46 on the top of the head 22 that allows the A-axis rollers 32 to pivot relative to the head.

Figures 4, 7:
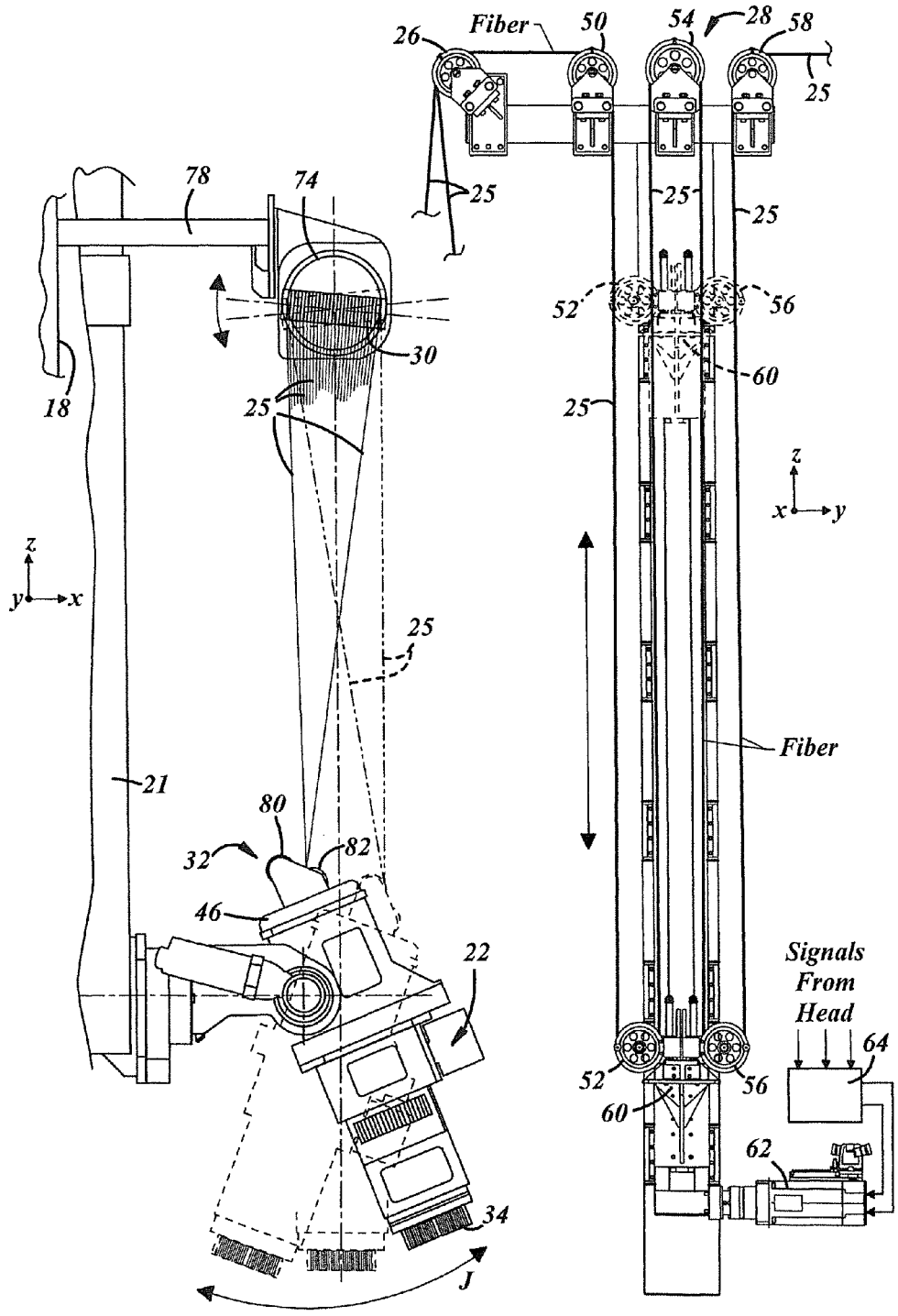
FIG. 4 is a front view of a festoon for a fiber placement machine.
FIG. 7 is a side view of a fiber placement machine head and the A-axis and B-axis rollers.
Figure 5:
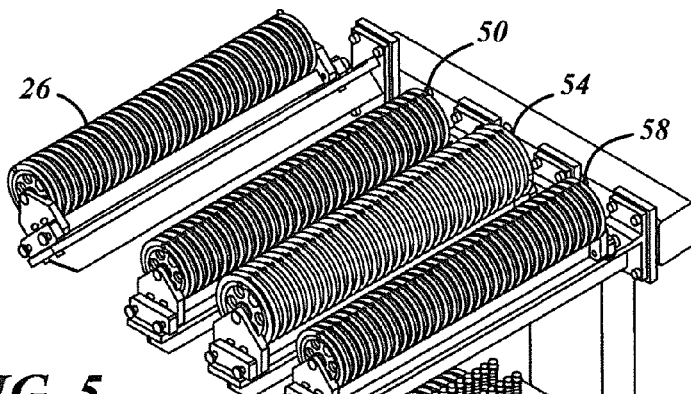
FIG. 5 is a perspective view of a festoon for a fiber placement machine.
Figure 6:
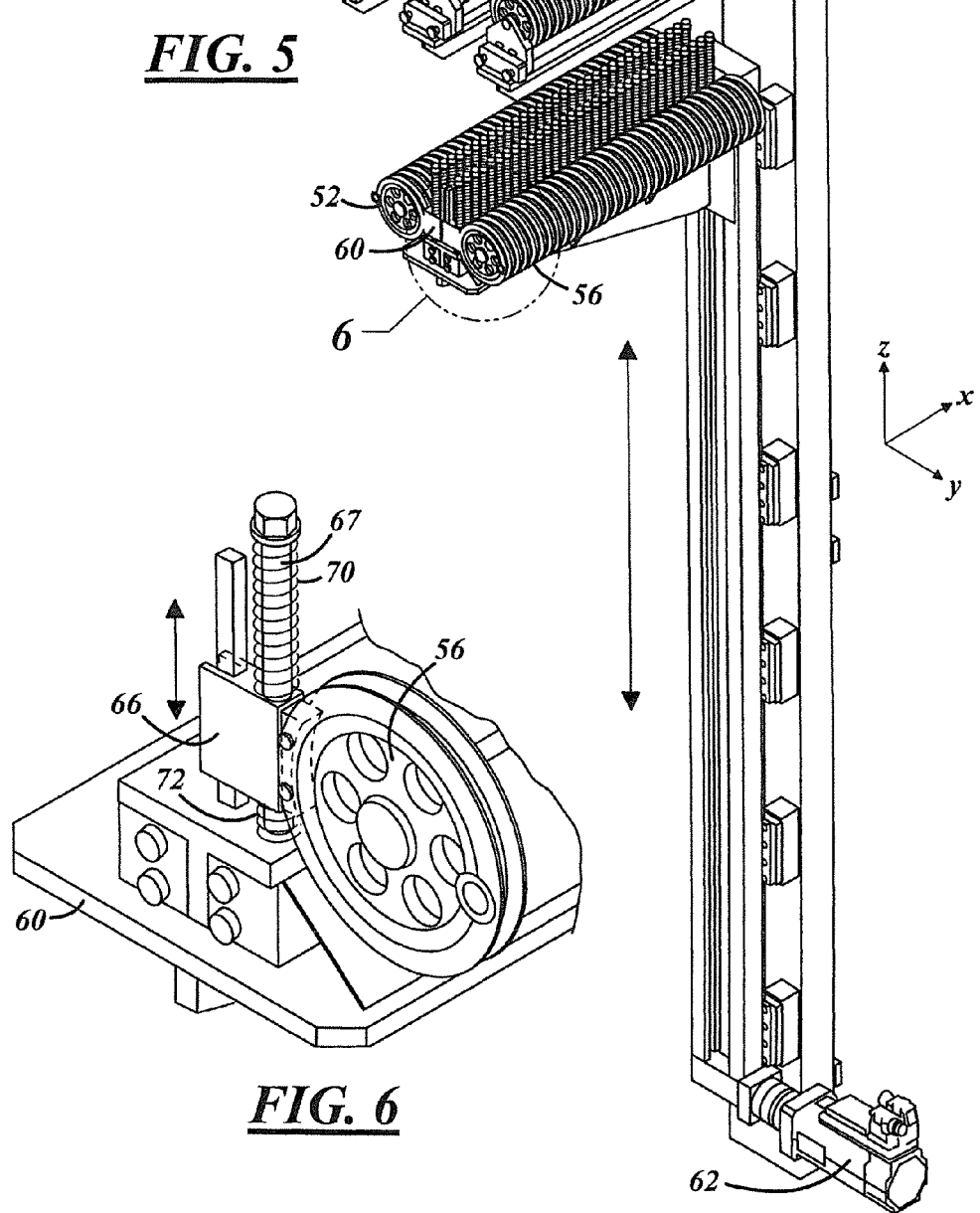
FIG. 6 is a detail view of a spring mounted roller from the festoon of FIGS. 4 and 5.

FIGS. 4, 5, and 6 show the festoon mechanism 28 in greater detail. The festoon mechanism 28 utilizes a vertically moveable roller carriage 60 and forms the V-axis for the fiber 25 to take up and pay out slack in the fiber between the creel 23 and the head 22 as the head moves to apply fiber to a 3-dimensional tool. The fiber bands 25 must not be allowed to become slack between the creel 23 and the head 22 since that would cause adjacent fiber bands to become entangled with one another. The fiber path through the festoon 28 starts at an upper stationary redirect roller 26. The fiber path then goes to a first upper stationary festoon roller 50 and from the first upper stationary festoon roller to a first lower festoon roller 52. The fiber path then goes back up to a second upper stationary festoon roller 54 and then proceeds down to a second lower festoon roller 56, and then up again to a third upper stationary festoon roller 58.

The lower festoon rollers 52 and 56 are mounted on the vertically moveable roller carriage 60. FIG. 4 shows in solid the vertically movable roller carriage 60 and the lower festoon rollers 52,56 in the maximum slack take up position in which the carriage 60 is lowered to a position that is as far as possible from the upper stationary festoon rollers 50, 54 and 58. FIG. 4 shows in phantom the vertically movable roller carriage 60 in the minimum slack take up position with the carriage raised to a position that is in relative proximity to the upper stationary festoon rollers 50, 54, and 58. The position of the movable roller carriage 60 is driven by a servo motor 62 that is mechanically coupled to the movable roller carriage 60. The servo motor 62 is coupled to a controller 64 that receives signals relating to the 3-dimensional motion of the head 22 to raise or lower the movable roller carriage to take up fiber slack as the head moves toward the creel, or to pay out fiber as the head moves away from the creel. Because of the multiple parallel fiber paths that the tow traverses between the upper festoon rollers 50, 54, and 58, and the lower festoon rollers 52,56, a motion of one meter of the movable roller carriage 60 results in a change in fiber length that is available at the head 22 of four meters. Thus, the festoon mechanism 28 is able to take up and pay out slack in a ratio of 1:4. The festoon 28 may be designed with greater or lesser ratios as may be required by the particular fiber placement machine.

FIG. 5 shows that the upper and lower festoon roller assemblies are actually banks of thirty-two separately mounted rollers, one for each fiber lane. The number of rollers provided in the festoon roller assemblies may be more or less, depending on the number of fiber lanes that are required between the creel and the head.

FIG. 6 shows in detail the mounting of the blocks 66 that support the one of the individual rollers 56 on the roller carriage 60. The blocks 66 are mounted on guide rods 67 with springs 70 and 72 above and below the block 66, respectively, so that the rollers 56 may raise and lower to provide the proper amount of dampening in the individual fiber lanes. Although not shown on FIG. 6, the rollers 52 are mounted on the roller carriage 60 in the same way.

The fiber 25 travels horizontally from the festoon 28 downstream to a B-axis roller 30 which is mounted on the saddle 12 adjacent to the column 21 and directly above the head 22. The B-axis roller 30 changes the direction of travel of the fiber band 25 from horizontal to vertical for delivery of the fiber to the top of the fiber placement head 22. As shown in FIGS. 2 and 7, The B-axis roller 30 is mounted in a swivel 74 that has an axis of rotation that is parallel to the Y-axis, whereby the B-axis roller 30 is able to swivel to twist the orientation of the fiber band in response to motion of the head 22. The B-axis roller is mounted to the saddle 18 and moves with the column 21 in the Y-axis to maintain the B-axis roller in vertical alignment with the head 22, but does not move vertically in the A-axis with the head 22, but instead remains aligned in the Y-axis with the upper festoon rollers 50, 54, and 58.

As shown in FIGS. 2 and 7, the fiber travels from the B-axis roller 30 vertically downward to the A-axis rollers that are positioned on the top of the head 22. The A-axis rollers 32 are mounted on a swivel 76 having an axis of rotation that is parallel to the K-axis 44 of the head to enable the fiber band 25 to twist as required by the motion of the head. The swivel 76 is mounted to the saddle 18 by struts 78.

Figure 9:
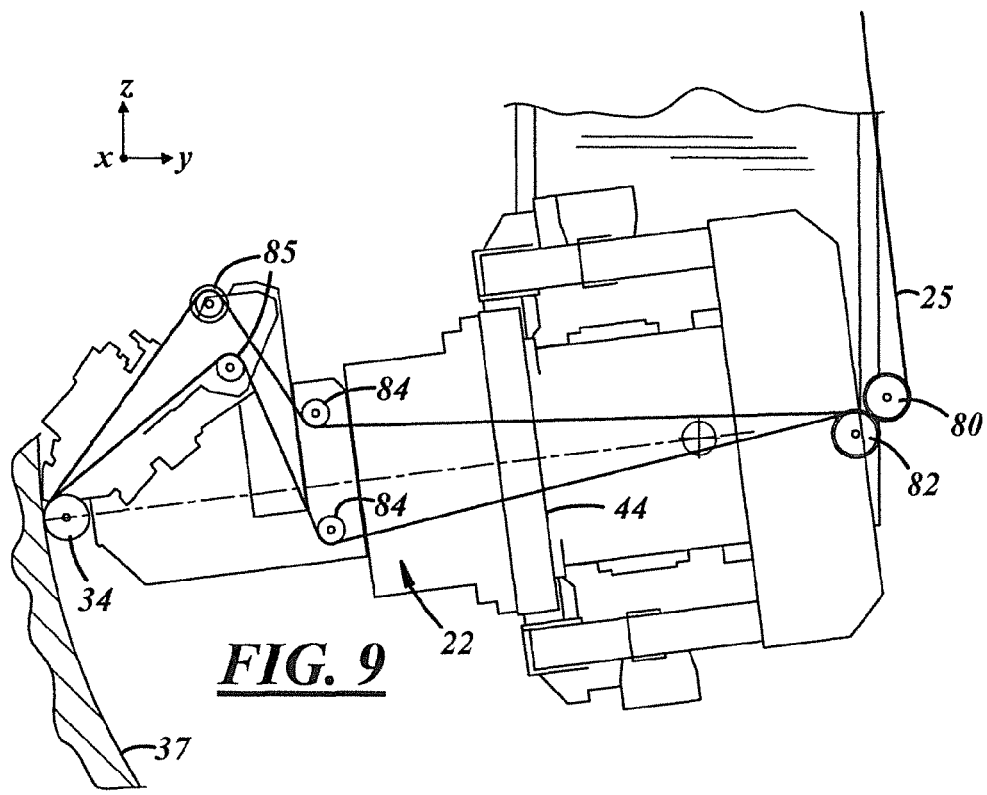
FIG. 9 is a front view of a fiber placement head pivoting to the left showing the fiber path through the A-axis rollers.
Figure 10:
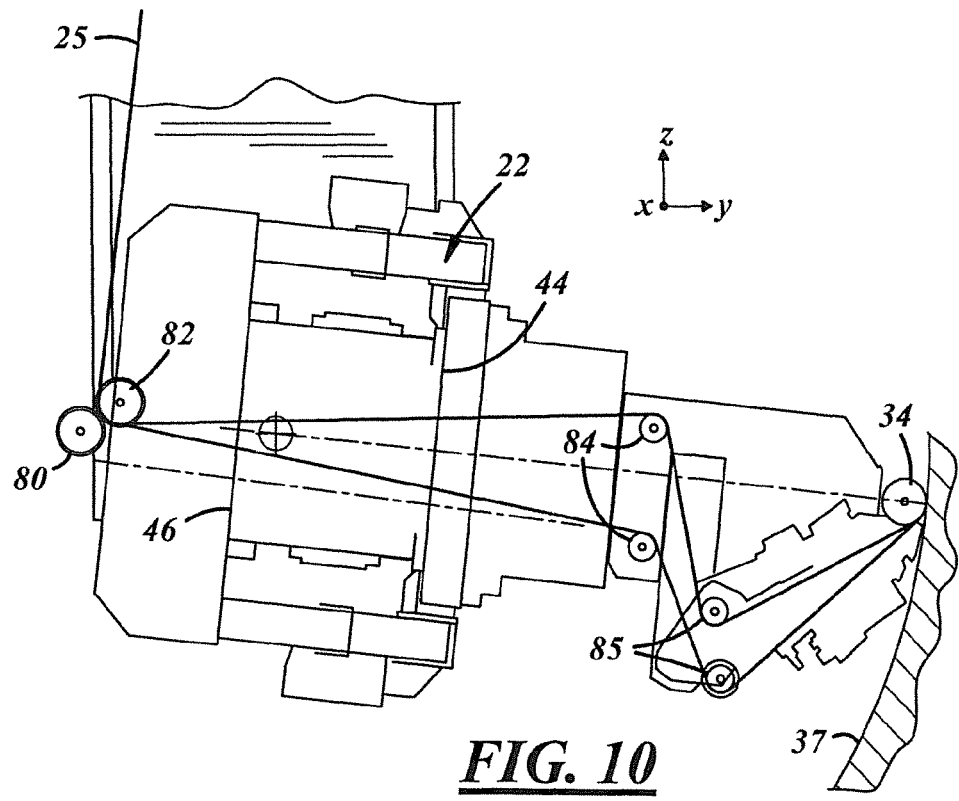
FIG. 10 is a front view of a fiber placement head pivoting to the right showing the fiber path through the A-axis rollers.
Figure 11:
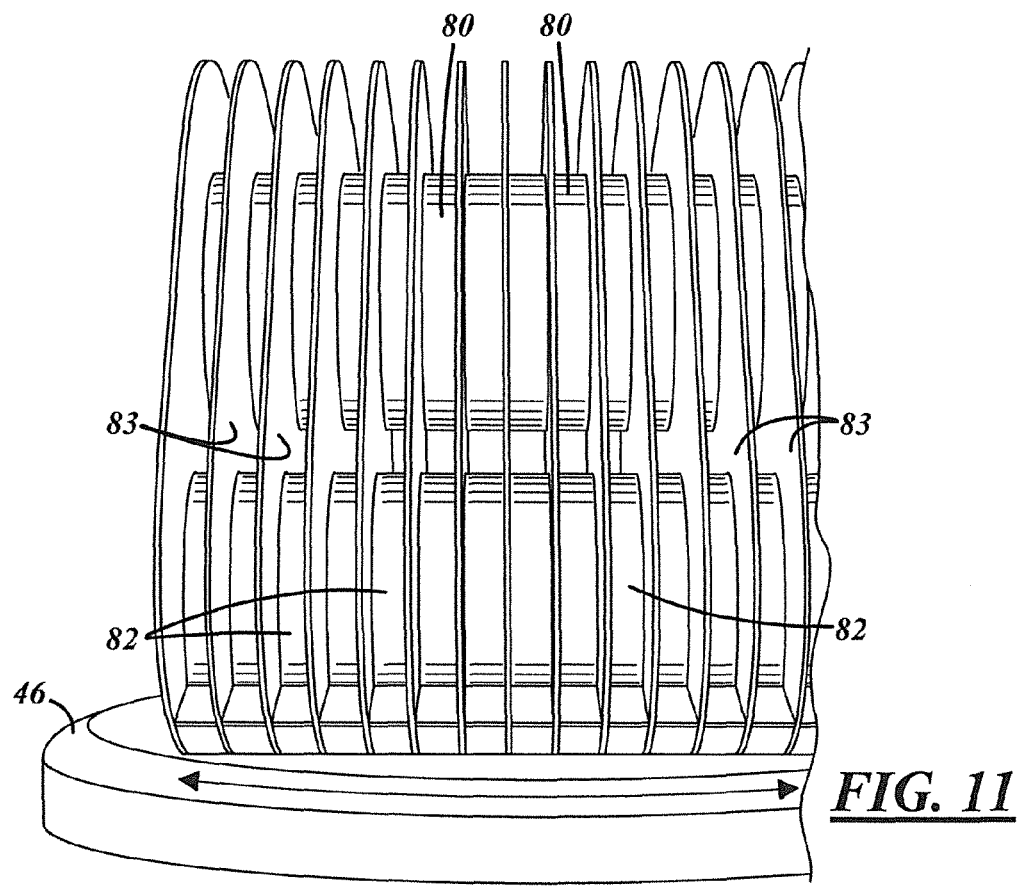
FIG. 11 is a detail view of the A-axis rollers showing the divider plates between adjacent rollers.

FIGS. 9-11 show that the A-axis rollers 32 comprise an upper set of rollers 80 and a lower set of rollers 82 which are mounted on the swivel 76 to twist the fiber band as required by the head. The rollers are separated by guide plates 83 as best seen in FIG. 11. The fiber 25 is in contact with the upper or the lower set of A-axis rollers, or both sets at one time, depending on the position of the head 22. The two sets of rollers are required in order to allow the head 22 to execute a sweeping motion around the I-axis 40 as required by the contour of the surface 37. The guide plates 83 prevent adjacent fibers from coming into contact with one another and from switching to the incorrect corresponding roller when the fibers switch from one of the A-axis rollers 80 or 82 to the other. Intermediate redirect rollers 84 and 85 are provided in the head to direct the fiber tow 25 to the compaction roller 34 positioned at the lower most position of the head. The compaction roller 34 applies the fiber tow to a mold or tool in order to form a part.

Figure 8:
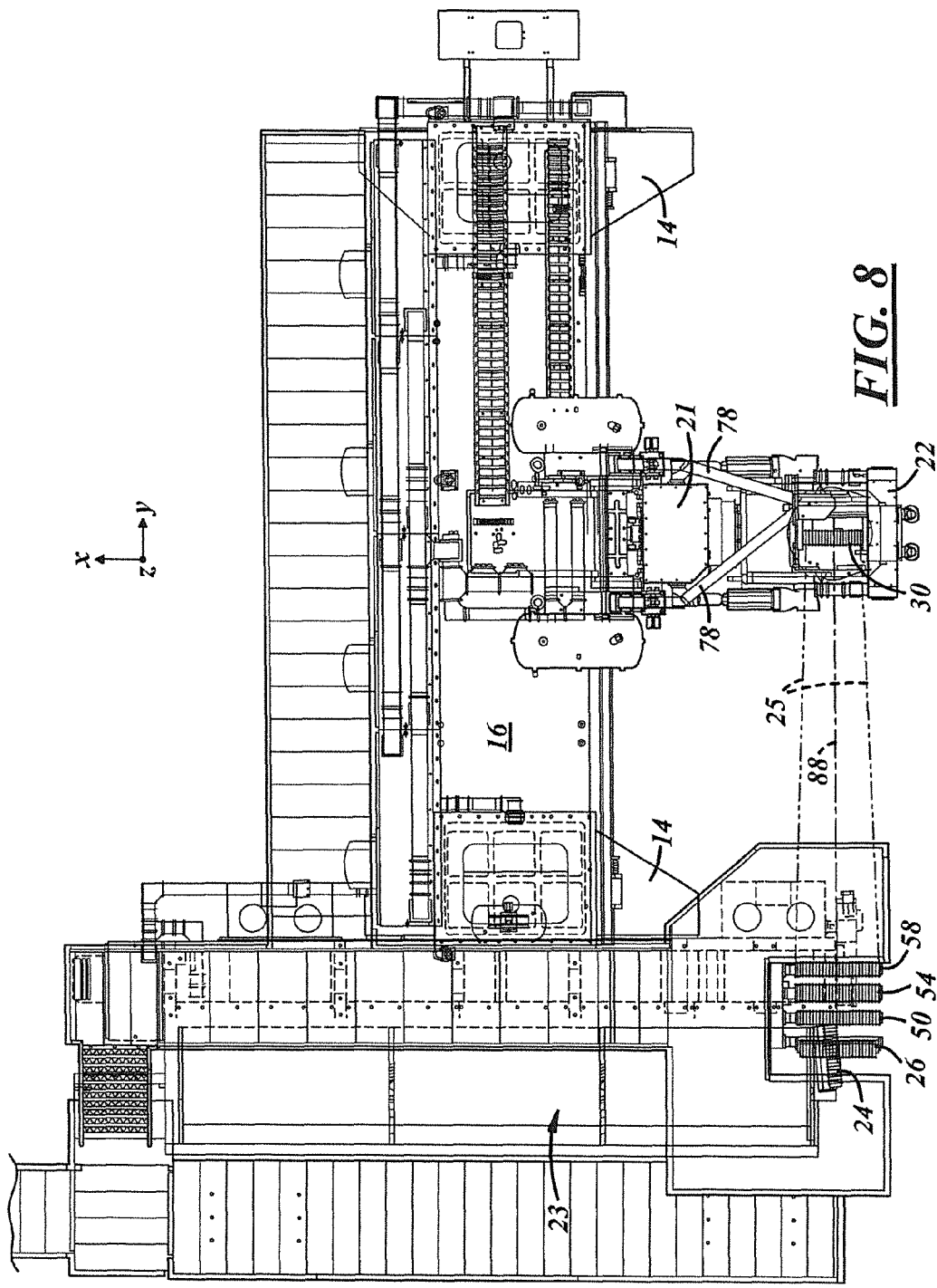
FIG. 8 is a top view of the gantry, the column and the head of a fiber placement machine.

As shown in FIG. 8, the machine is arranged so that the creel redirect roller 24, the upper festoon rollers 50, 54, 58, the B-axis roller 30, and the A-axis rollers 32 are all in a common plane 88 that is perpendicular to the X- axis. Although not shown in FIG. 8, the lower festoon rollers 52 and 56 are also in the same plane 88.

In operation, the fiber placement machine has 6 axes of motion and a creel that moves with the gantry. The gantry 12 moves in the X-axis along the rails 17 to apply fiber to a mold or tool 27 that is located beneath the gantry, and the creel 23 moves with the gantry 12 in the X-axis. The head 22 is attached to the vertical column 21 and moves in the Y-axis parallel to the floor and across the gantry beam. As the head 22 moves along the Y-axis to the left, slack is created in the fiber path between the head and the creel 23. The festoon mechanism 28 is designed to quickly take up slack that is created in the fiber as the head moves toward the creel 23, and to quickly pay out fiber as the head moves away from the creel. The head 22 and the vertical column 21 also move vertically in the Z-axis, perpendicular to the X and Y-axes. The head swivels 180 degrees in the I-axis 40 as it rotates about the X-axis, in the J-axis 42 as it rotates about the Y-axis, and in the K-axis 44 as it rotates about an axis that is perpendicular to the I and J-axes. The head 22 has a home position as shown in solid in FIG. 2 that positions the center axis 35 of the compaction roller 34 parallel to the X-axis and to the long axis of a composite part, whereby the head is required to rotate only 90° from the home position to place fiber along the X-axis of a tool in either the plus X or the minus X direction. The home position of the head 22 shortens the amount of time required by the head to get into position to lay fiber along the long axis of a composite part, a spar, or a shear web.

Having thus described the device, various alterations and modifications and alterations will be apparent to those skilled in the art, which alterations and modifications are intended to be within the scope of the invention as defined by the appended claims.

I claim:

1. A gantry mounted fiber placement machine having a creel and a head with a compaction roller for applying fiber to a mold or tool, the fiber placement machine having 6 axes of motion, wherein the creel moves with the gantry, the machine comprising:
    a gantry that moves in an X-axis and a horizontal gantry beam that is parallel to a Y-axis;
    a creel that moves with the gantry in the X-axis;
    a head that moves in a Y-axis parallel to the floor and across the gantry beam;
    a head that moves in a Z-axis perpendicular to the X and Y-axes;
    a head that swivels in an I-axis as it rotates about the X-axis;
    a head that swivels in a J-axis as it rotates about the Y-axis;
    a head that swivels in a K-axis as it rotates about the Z-axis;
    a B-axis roller mounted on the gantry above the head, whereby the B-axis roller changes the direction of travel of the fiber band from horizontal to vertical for delivery of the fiber to the top of the fiber placement head;
    an A-axis roller mounted on the head above the opening that receives the fibers and below the B-axis roller, the A-axis roller mounted on a swivel to enable the fiber band to twist around the Z-axis as required by the motion of the head;
    two adjacent rollers comprising the A-axis roller, the adjacent rollers enabling the head to swivel + and −90 degrees about the I-axis while the at least one of the adjacent rollers maintains contact with the fiber tows;
    an upper set of rollers and a lower set of rollers comprising the A-axis rollers; and
    the rollers of the upper and lower sets being separated by guide plates, whereby the guide plates prevent adjacent fibers from contacting one another and from switching to the incorrect corresponding roller when the fibers switch from one A-axis roller to the other A-axis roller.

2. The gantry mounted fiber placement machine of claim 1 further comprising:
    an opening in the top of the head for receiving fiber, whereby fiber is delivered into the head in a vertical direction, along the Z-axis.

3. The gantry mounted fiber placement machine of claim 1 further comprising:
    a vertical V-axis for the fiber between the creel and the head, whereby a mechanism along the V-axis takes up and pays out slack in the fiber between the creel and the head as the head moves to apply fiber to a 3-dimensional tool.

4. The gantry mounted fiber placement machine of claim 3 further comprising:
    fixed festoon rollers and movable festoon rollers comprising the mechanism along the V-axis, whereby a one meter motion of the movable festoon rollers results in a four meter motion of the fiber at the head.

5. The gantry mounted fiber placement machine of claim 1 further comprising:
    a swivel mount for the B-axis roller, whereby the B-axis roller is able to twist around the Y-axis to change the orientation of the fiber band in response to motion of the head.

6. The gantry mounted fiber placement machine of claim 1 wherein the B-axis roller is mounted downstream of the festoon rollers.

7. The gantry mounted fiber placement machine of claim 1 whereby the head swivels through an angle of at least 180 degrees about the I-axis to enable it to lay fiber in a half pipe mold having an axis of curvature that extends along the X-axis.

8. The gantry mounted fiber placement machine of claim 1 whereby the gantry and the creel move together along the X-axis to follow the long axis of a composite part.

9. The gantry mounted fiber placement machine of claim 1 further comprising:
    a home position for the head that orients the center axis of the compaction roller parallel to the X-axis and to the long axis of a composite part, whereby the head is required to rotate only 90 degrees from the home position to place fiber along the X-axis in either the plus X or the minus X direction.

10. The gantry mounted fiber placement machine of claim 4 further comprising:
    a servo drive for the movable festoon rollers, whereby the motion of the movable festoon rollers is determined by 3-D motion of the head as it follows the contour of a mold or tool.

11. The gantry mounted fiber placement machine of claim 1 further comprising:
    a saddle cantilever mounted on the face of the gantry beam, the saddle being movable in the Y-axis across the gantry beam;
    a vertical slide mounted on the saddle for motion in the Z-axis; and,
    an I-axis swivel coupling the head to the vertical slide, whereby the head is able to rotate about the I-axis relative to the vertical slide.

12. The gantry mounted fiber placement machine of claim 11 further comprising:
    a J-axis pivot between the I-axis swivel and the head, whereby the head is able to rotate about the J-axis relative to the I-axis swivel.

13. The gantry mounted fiber placement machine of claim 12 further comprising:
    a K-axis swivel between the J-axis pivot and the head, whereby the head is able to rotate about the K-axis relative to the J-axis pivot.

14. A gantry mounted fiber placement machine having a creel and a head with a compaction roller for applying fiber to a mold or tool, the fiber placement machine having 6 axes of motion, wherein the creel moves with the gantry, the machine comprising:
- a gantry that moves in an X-axis and a horizontal gantry beam that is parallel to a Y-axis;
- a creel that moves with the gantry in the X-axis;
- a head that moves in a Y-axis parallel to the floor and across the gantry beam;
- a head that moves in a vertical Z-axis perpendicular to the X and Y-axes;
- a head that swivels in an I-axis as it rotates about the X-axis;
- a head that swivels in a J-axis as it rotates about the Y-axis;
- a head that swivels in a K-axis as it rotates about the Z-axis;
- a B-axis roller mounted on the gantry above the head, whereby the B-axis roller changes the direction of travel of the fiber band from horizontal to vertical for delivery of the fiber to the top of the fiber placement head;
- an A-axis roller mounted on the head above the opening that receives the fibers and below the B-axis roller, the A-axis roller mounted on a swivel to enable the fiber band to twist around the Z-axis as required by the motion of the head; and,
- festoon input and output rollers and festoon fixed and movable rollers, wherein the festoon input and output rollers, the festoon fixed and movable rollers, the B-axis roller, the A-axis roller, and the compaction roller are all in a common plane that is perpendicular to the X-axis.

\* \* \* \* \*